United States Patent [19]

Grossman et al.

[11] Patent Number: 4,518,765

[45] Date of Patent: May 21, 1985

[54] ANIONIC POLYMERIZATION OF LACTAM WITH AZETIDINE-2,4-DIONE PROMOTER

[75] Inventors: Steven J. Grossman, Cheshire; Kemal Onder, North Haven, both of Conn.

[73] Assignee: The Upjohn Company, Kalamazoo, Mich.

[21] Appl. No.: 591,310

[22] Filed: Mar. 19, 1984

[51] Int. Cl.$^3$ ............................................. C08G 69/20
[52] U.S. Cl. .................................. 528/314; 528/315; 528/316; 528/323
[58] Field of Search ................ 528/314, 315, 316, 323

[56] References Cited

U.S. PATENT DOCUMENTS

| | | | |
|---|---|---|---|
| 3,016,366 | 1/1962 | Glickman et al. | 528/314 |
| 3,234,152 | 2/1966 | Fuller | 260/2.5 |
| 3,671,500 | 6/1972 | Johnson | 528/314 |

FOREIGN PATENT DOCUMENTS 1294020  4/1969  Fed. Rep. of Germany ....... 260/2.5

Primary Examiner—Harold D. Anderson
Attorney, Agent, or Firm—James S. Rose; Denis A. Firth

[57] ABSTRACT

An improved process for the anionic polymerization of lactams is described. Particular azetidinedione compounds are employed as promoters and their use not only permits low polymerization temperatures but gives rise to faster polymerization reactions than prior art procedures allow.

The rapid polymerization of caprolactam in accordance with the present invention makes the process particularly suited to RIM procedures for preparing molded polyamides.

9 Claims, No Drawings

ANIONIC POLYMERIZATION OF LACTAM WITH AZETIDINE-2,4-DIONE PROMOTER

BACKGROUND OF THE INVENTION

1. Field of the Invention

This invention relates to the preparation of polyamides by the anionic polymerization of lactams and is more particularly concerned with improvements in the polymerization process. 2. Description of the Prior Art The anionic base-catalyzed polymerization of cyclic lactams to yield the corresponding polyamides is widely known and described in the literature. It has been reported that a wide variety of materials can be used as initiators or promoters of the polymerization. The use of acyl bislactams such as N,N'-terephthaloyl or N,N'-isophthaloyl biscaprolactam have long been known in this application (see U.S. Pat. No. 3,234,152) as well as certain N-substituted cyclic imides (see German Auslegeschrift No. 1294020).

We have now found that the use of a new class of promoter in the anionic polymerization of lactams gives rise to highly useful and different results from the above prior art promoters.

SUMMARY OF THE INVENTION

The invention comprises an improved process for the preparation of a polyamide by polymerizing a lactam in the presence of a base catalyst and a promoter wherein the improvement comprises employing a compound containing an azetidine-2,4-dione moiety as promoter.

The term lactam means any of the aliphatic lactams capable of being polymerized to the corresponding nylon type polyamide, and, illustratively, includes pyrrolidinone, valerolactam, caprolactam, caprylactam, decanolactam, laurolactam, and the like.

The term "a compound containing an azetidine-2,4-dione moiety" means a compound containing at least one azetidine-2,4-dione ring having the formula

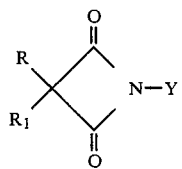

wherein R and $R_1$ when taken separately are independently selected from the group consisting of hydrogen and hydrocarbyl and R and $R_1$ taken together with the carbon atom to which they are joined represent cycloalkane having 4 to 8 ring carbon atoms, inclusive, and Y is selected from the group consisting of hydrocarbyl, hydrocarbyl substituted by one or more azetidine-2,4-dionyl rings, and radicals having the formula

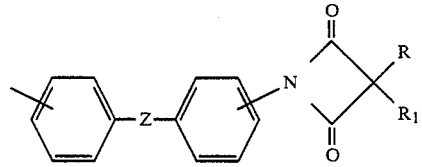

wherein R and $R_1$ are as defined above and Z is selected from the group consisting of —CO—, —O—, —SO₂—, and alkylene having 1 to 4 carbon atoms, inclusive.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as vinyl, allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like, including isomeric forms thereof; and cycloalkenyl such as cyclopentenyl, cyclohexenyl, cycloheptenyl, cyclooctenyl, and the like, including isomeric forms thereof.

The hydrocarbyl groups which form the groups R, $R_1$ and Y can be substituted by one or a plurality of inert substituents. The term "inert substituent" means inert under the conditions of the polymerization process and does not otherwise interfere with said process. Illustrative of such substituents are halo, i.e. chloro, bromo, fluoro and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; alkylmercapto from 1 to 8 carbon atoms, inclusive, such as methylmercapto, ethylmercapto, propylmercapto, butylmercapto, pentylmercapto, hexylmercapto, heptylmercapto, octylmercapto, and the like, including isomeric forms thereof; and cyano.

Illustrative of the term "cycloalkane having 4 to 8 ring carbon atoms" are cyclobutane, 3-methylcyclobutane, cyclopentane, 3-methylcyclopentane, cyclohexane, 3-methylcyclohexane, 4-methylcyclohexane, cycloheptane, 4-methylcycloheptane, cyclooctane, 5-methylcyclooctane, and the like.

DETAILED DESCRIPTION OF THE INVENTION

The improved process of the invention is carried out substantially in accordance with the procedures normally employed in the art in the base-catalyzed anionic polymerization of lactams, the novel feature being the use of the azetidine-2,4-dione compounds as the promoters.

A preferred lactam for polymerization in accordance with the present process is caprolactam.

The preferred promoters for use in the present process have the formula

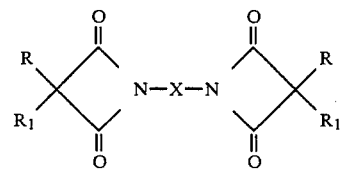

wherein R and $R_1$ are as defined above and X is selected from the group consisting of alkylene having 1 to 8 carbon atoms, inclusive, such as methylene, ethylene, propylene, butylene, pentylene, hexylene, heptylene, octylene, and isomeric forms thereof, cycloalkylene having 5 to 6 carbon atoms, inclusive, such as 1,3-cyclopentylene, 1,3-cyclohexylene, 1,4-cyclohexylene, arylene having 6 to 18 carbon atoms, inclusive, such as phenylene, tolylene, naphthylene, diphenylylene, and divalent radicals having the formula

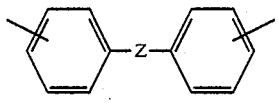

wherein Z is defined above.

The most preferred class of the promoters are those wherein X is arylene defined above and R and $R_1$ are the same or different lower-alkyl groups having 1 to 4 carbon atoms, inclusive.

Illustrative but not limiting of the azetidinedione compounds are N-methylazetidine-2,4-dione, N-methyl-3,3-dimethylazetidine-2,4-dione, N-ethyl-3,3-dimethylazetidine-2,4-dione, N-phenyl-3,3-dimethylazetidine-2,4-dione, N-phenyl-3-ethyl-3-butylazetidine-2,4-dione, N-allyl-3,3-dimethylazetidine-2,4-dione, N-cyclohexyl-3,3-dimethylazetidine-2,4-dione, and the like; 1,2-bis(3,3-dimethyl-2,4-dioxo-azetidino)ethane, 1,4-bis(3,3-dimethyl-2,4-dioxo-azetidino) butane, 1,6-bis(3,3-dimethyl-2,4-dioxoazetidino)hexane, 1,2-bis(3-methyl-3-benzyl-2,4-dioxoazetidino)ethane, 1,2-bis(3-methyl-3-phenyl-2,4-dioxoazetidino)ethane, 1,2-bis(3-methyl-3-cyclohexyl-2,4-dioxoazetidino)ethane, 1,4-bis(3-methyl-3-allyl-2,4-dioxoazetidino)butane, 1,4-bis(3-methyl-3-phenyl-2,4-dioxoazetidino)butane, 1,6-bis(3-methyl-3-butyl-2,4-dioxoazetidino)hexane, 1,6-bis(3-benzyl-3-phenyl-2,4-dioxoazetidino)hexane, 1,6-bis(3,3-diethyl-2,4-dioxo-azetidino)hexane, and the like; 1,3-bis(3-methyl-3-phenyl-2,4-dioxo-azetidino)cyclopentane, 1,4-bis(3,3-dimethyl-2,4-dioxo-azetidino)cyclohexane, 1,4-bis(3-p-chlorobenzyl-3-phenyl-2,4-dioxo-azetidino)cyclohexane, and the like; 1,4-bis(2,4-dioxoazetidino)benzene, 1,4-bis(3,3-dimethyl-2,4-dioxoazetidino)benzene, 1,4-bis(3,3-diethyl-2,4-dioxoazetidino)benzene, 1,4-bis(3-ethyl-3-butyl-2,4-dioxoazetidino)benzene, 1,3-bis(3,3-dimethyl-2,4-dioxoazetidino)benzene, 1,3-bis(3-ethyl-3-butyl-2,4-dioxoazetidino)benzene, 1,3-bis(3,3-dimethyl-2,4-dioxoazetidino)-2-methyl- and -6-methylbenzene and mixtures thereof, 1,3-bis(3,3-diethyl-2,4-dioxo-azetidino)-2-methyl- and -6-methylbenzene and mixtures thereof, 1,3-bis(3-ethyl-3-butyl-2,4-dioxo-azetidino)-2-methyl- and -6-methylbenzene and mixtures thereof, 1,3-bis(3,3-dibutyl-2,4-dioxo-azetidino)-2-methyl- and -6-methylbenzene and mixtures thereof, 1,3-bis(3-methyl-3-phenyl-2,4-dioxo-azetidino)-2-methyl- and -6-methylbenzene and mixtures thereof, 1,3-bis(3-methyl-3-cyclohexyl-2,4-dioxo-azetidino)-2-methyl- and -6-methylbenzene and mixtures thereof, 1,3-bis(3-methyl-3-allyl-2,4-dioxo-azetidino)-2-methyl- and -6-methylbenzene and mixtures thereof, 1,3-bis(3-methyl-3-benzyl-2,4-dioxo-azetidino)-2-methyl- and -6-methylbenzene and mixtures thereof, 1,1'-methylenebis[4-(2,4-dioxo-azetidino)benzene], 1,1'-methylenebis[4-(3,3-dimethyl-2,4-dioxoazetidino)benzene], 1,1'-methylenebis[4-(3,3-diethyl-2,4-dioxo-azetidino)benzene], 1,1'-methylenebis[4-(3,3-dipropyl-2,4-dioxo-azetidino)benzene], 1,1'-methylenebis[4-(3,3-dibutyl-2,4-dioxo-azetidino)benzene], 1,1'-methylenebis[4-(3-ethyl-3-butyl-2,4-dioxoazetidino)benzene], 1,1'-methylenebis[4-(3-methyl-3-phenyl-2,4-dioxo-azetidino)benzene], 1,1'-methylenebis[4-(3-methyl-3-benzyl-2,4-dioxoazetidino)benzene], 1,1'-methylenebis[4-(3,3-tetramethylene-2,4-dioxo-azetidino)benzene], 1,1'-methylenebis[4-(3,3-pentamethylene-2,4-dioxoazetidino)benzene], 1,1'-carbonylbis[4-(3,3-dimethyl-2,4-dioxo-azetidino)benzene], 1,1'-carbonylbis[4-(3-ethyl-3-butyl-2,4-dioxoazetidino)benzene], 1,1'-oxybis[4-(3,3-dimethyl-2,4-dioxoazetidino)benzene], 1,1'-oxybis[4-(3-ethyl-3-butyl-2,4-dioxo-azetidino)benzene], and the like.

Preferred amongst the species set forth above are 1,1'-methylenebis[4-(3,3-dimethyl-2,4-dioxo-azetidino)-benzene], 1,1'-methylenebis[4-(3,3-diethyl-2,4-dioxoazetidino)benzene], 1,1'-methylenebis[4-(3-ethyl-3-butyl-2,4-dioxo-azetidino)benzene], 1,1'-carbonylbis[4-(3,3-dimethyl-2,4-dioxo-azetidino)benzene], 1,1'-carbonylbis[4-(3-ethyl-3-butyl-2,4-dioxo-azetidino)benzene], and the like.

The azetidinediones are known compounds and are readily prepared using the procedures set forth in U.S. Pat. No. 3,265,684 wherein the appropriately substituted acid chlorides are reacted with the appropriate isocyanate in the presence of tertiary amines to form the azetidinediones. Using the appropriate diisocyanates and 2 molar proportions of the acid chlorides provides the diazetidinediones. The teaching of the above patent is incorporated herein by reference.

Alternatively, the azetidinediones can be prepared by the reaction of the appropriately substituted ketene and mono- or diisocyanate as disclosed by Martin et al in J. Organic Chemistry 36, 1971, p 2205 et seq. Yet another preparative method involves the reaction of the appropriate amine with the appropriately substituted malonyl chloride in accordance with the method of Ebnöther et al, Helvetica Chemica Acta 42, 1959, pp 918 to 955.

In carrying out the process of the invention the starting lactam is employed under substantially anhydrous conditions and is usually heated to the melting point under nitrogen or other inert gas atmosphere before being treated with the base catalyst and the promoter. The catalyst and the promoter can be added in either order, or simultaneously, without significant effect on the outcome of the process. The resulting mixture is then heated to and maintained at a temperature within the range of about 80° C. to about 250° C. until the polymerization of the lactam has reached the desired stage. While the reaction temperature can be maintained anywhere in the above range, it is preferably maintained in the range of about 80° C. to about 155° C.

The progress of the polymerization is very rapid and, generally speaking, is over in a matter of minutes. This feature makes the process in accordance with the present invention particularly useful when it is desired to rapidly reaction mold polycaprolactam as in the reaction injection molding (RIM) technique.

The base catalyst which is employed in the process of the invention can be any of those used in the art for catalyzing the anionic polymerization of lactams. Illustrative of such catalysts are the alkali metal and alkaline earth metals, e.g. sodium, potassium, rubidium, caesium, magnesium and the like, either in the metallic form or in the form of their hydrides, borohydrides, oxides, hydroxides, carbonates, amides and the like. Organometallic derivatives of the alkali and alkaline earth metals are also useful as catalysts; illustrative of such derivatives are sodium, potassium, and lithium alkyls and aryls such as butyl lithium, butyl sodium, sodium phenyl and the like, and Grignard reagents such as ethyl magnesium chloride, methyl magnesium bromide, ethyl magnesium bromide, and the like.

The amount of base catalyst employed can vary over a wide range, advantageously from about 0.1 mole percent to about 10 mole percent based on lactam. Preferably however, the amount of base catalyst is within the range of about 0.2 mole percent to about 5 mole percent based on lactam.

The amount of the azetidinedione promoter employed in the process of the invention can also vary over wide limits. Advantageously, the amount of said azetidinedione is from about 0.3 mole percent to about 5.0 mole percent based on lactam. Preferably, the amount of said azetidinedione is from about 0.6 mole percent to about 2.0 mole percent.

The surprising and advantageous feature inherent in the present process is the speed with which the lactam can be polymerized. One of the fastest promoters known in the art for promoting the polymerization of caprolactam is isophthaloyl biscaprolactam. However, in a comparative test (see Example 2 below) the process in accordance with the present invention has been found to result in a faster polymerization reaction than the prior art process using isophthaloyl biscaprolactam. It is this feature which makes the present process particularly suited to RIM procedures.

The following examples describe the manner and process of making and using the invention and set forth the best mode contemplated by the inventors of carrying out the invention but are not to be construed as limiting.

EXAMPLE 1

The following example describes a process for the polymerization of caprolactam in accordance with the present invention.

A 26.91 g. (0.238 mole) charge of freshly distilled caprolactam was transferred under argon to a dry nitrogen purged side-arm test tube equipped with a thermocouple for measuring temperature. The caprolactam was heated to 130° C. in an oil bath and 0.2 ml. of a 3.1 molar solution of ethyl magnesium bromide in diethyl ether (0.00062 mole of ethyl magnesium bromide or 0.27 mole percent based on caprolactam) was added to the molten material. Approximately 1 minute after the addition of the ethyl magnesium bromide, 0.99 g. (0.0019 mole or 0.83 mole percent based on caprolactam) of 1,1'-methylenebis[4-(3-ethyl-3-butyl2,4-dioxo-azetidino)benzene] was added to the molten mixture.

After about 5 minutes the molten caprolactam gelled and the clear melt turned to a white solid plug. The temperature rose from the initial 130° C. mark to 190° C. over a period of about 7½ minutes after the addition of the azetidinedione.

After 1 hour of heating at 130° C. the tube was removed from the bath and allowed to cool to room temperature. A 25.74 g. yield of polycaproamide was obtained having an inherent viscosity (ηinh) of 1.1 dl./g (0.5 percent solution in 88 percent formic acid at 30° C.).

EXAMPLE 2

The following example sets forth a series of eight polymerization experiments (Table I) wherein four different activators were employed in the polymerization of caprolactam under controlled heating conditions. Samples 1 through 5 are in accordance with the present invention while samples 6 through 8 are not. A differential scanning calorimetry (DSC) sample cup in a DuPont 990 Thermal Analyzer set for the DSC mode was used as the polymerization vessel for each sample.

The standard procedure employed was as follows with sample 1 illustratively set forth in detail. Using the apparatus and procedure set forth in Example 1, a 14.74 g. (0.13 mole) sample of caprolactam was heated to 90° C. The caprolactam was mixed with a 1.15 mole percent proportion and 0.3 mole percent proportion respectively of the ethyl magnesium bromide catalyst solution described in Example 1 and 1,1'-methylenebis[4-(3-ethyl-3-butyl-2,4-dioxo-azetidino)benzene]. After about a half to a full minute of argon bubbling through the molten mass to allow thorough mixing, an aliquot portion of the molten mixture was transferred to the DSC cup at 90° C. (beginning temperature) and under a nitrogen atmosphere the temperature of the cup was raised at the programmed rate of 10° C. per minute and the DSC trace recorded. From the DSC results, the temperature at which the polymerization began (polymer initiation) was observed to be 185° C. This point was the initiation of an exothermic event which ran concurrently with the polymerization as the polymer mass crystallized. The end of the polymerization was noted as the point where the DSC curve returned to the normal base-line (i.e. the exotherm was over). In the case of sample 1, 6 minutes and 12 seconds was the time for polymerization to be essentially completed. These results for experiment 1 are set forth in Table I.

For the samples 2 through 8, the respective amounts of caprolactam were 17.92 g. (0.159 mole), 13.52 g. (0.119 mole), 16.68 g. (0.148 mole), 17.1 g. (0.151 mole), 20.19 g. (0.179 mole), 17.61 g. (0.156 mole), and 13.63 g. (0.121 mole). Each sample was treated similarly to sample 1 using the same proportional amount of catalyst as above but with the proportions of the respective activators and at the beginning temperatures set forth in Table I.

Samples 2, 4, 6, and 7 were mixed similarly to sample 1 at 90° C. and small portions transferred to DSC sample cups at 90° C. to begin the programmed heating. Samples 3, 5, and 8 were mixed similarly to sample 1 but at a mixing and DSC cup temperatures of 80° C. The times for polymer initiation and completion are set forth in Table I.

A comparison of the samples 1 to 5 with the samples 6 to 8 at the same activator concentrations and beginning temperatures shows that the caprolactam begins to polymerize at approximately the same point for all the samples. However, the samples 1 to 5 are all comparatively faster than the 6 to 8 samples, even at the low activator level of 0.3 mole percent. At the 0.6 mole percent level the samples 2 through 5 polymerize from about 24 to about 30 percent faster than the samples 7 and 8.

TABLE I

| Activator/Mole % | Temp. (°C.) Beginning | Polymer Initiation | Time to Complete Polymerization (minutes:seconds) |
|---|---|---|---|
| 1,1'-methylenebis [4-(3-ethyl-3-butyl-2,4-dioxo-azetidino)- | | | |

TABLE I-continued

| Activator/Mole % | Temp. (°C.) Beginning | Polymer Initiation | Time to Complete Polymerization (minutes:seconds) |
|---|---|---|---|
| benzene]: | | | |
| 1. 0.3 | 90 | 185 | 6:12 |
| 2. 0.6 | 90 | 110 | 5:00 |
| 3. 0.6 | 80 | 107 | 4:18 |
| 1,1'-carbonylbis[4-(3-ethyl-3-butyl-2,4-dioxo-azetidino)-benzene]: | | | |
| 4. 0.6 | 90 | 90 | 4:48 |
| 1,1-methylenebis[4-(3,3-dimethyl-2,4-dioxo-azetidino)-benzene]: | | | |
| 5. 0.6 | 80 | 105 | 5:00 |
| Isophthaloyl biscaprolactam: | | | |
| 6. 0.3 | 90 | 180 | 6:24 |
| 7. 0.6 | 90 | 110 | 6:36 |
| 8. 0.6 | 80 | 99* | 6:06 |

*Average of 3 readings from 3 separate runs.

We claim:

1. In a process for the preparation of a nylon polyamide by polymerizing a lactam in contact with an anionic polymerization catalyst and a promoter, the improvement wherein the promoter is a compound containing an azetidine-2,4-dione moiety having the formula

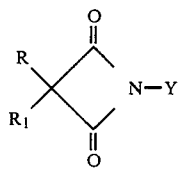

wherein R and R₁ when taken separately are independently selected from the group consisting of hydrogen and hydrocarbyl and R and R₁ taken together with the carbon atom to which they are joined represent cycloalkane having 4 to 8 ring carbon atoms, inclusive, and Y is selected from the group consisting of hydrocarbyl, hydrocarbyl substituted by one or more azetidine-2,4-dionyl rings, and radicals having the formula

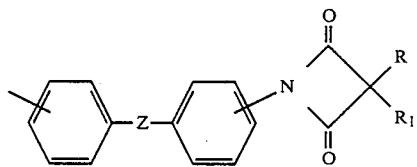

wherein R and R₁ are as defiend above and Z is selected from the group consisting of —CO—, —O—, —SO₂—, and alkylene having 1 to 4 carbon atoms, inclusive.

2. The process according to claim 1 wherein the lactam is caprolactam.

3. The process according to claim 1 wherein the promoter has the formula

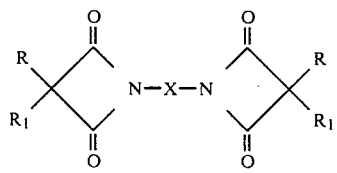

wherein R and R₁ when taken separately are independently selected from the group consisting of hydrogen and hydrocarbyl, and when R and R₁ are taken together with the carbon atom to which they are joined represent cycloalkane having 4 to 8 ring carbon atoms, inclusive, and X is selected from the group consisting of alkylene having 1 to 8 carbon atoms, inclusive, cycloalkylene having 5 to 6 carbon atoms, inclusive, arylene having 6 to 18 carbon atoms, inclusive, and divalent radicals having the formula

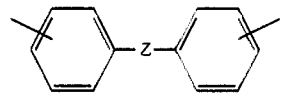

wherein Z is selected from the group consisting of —CO—, —O—, —SO₂—, and alkylene having 1 to 4 carbon atoms, inclusive.

4. The process of claim 2 wherein the base catalyst is ethyl magnesium bromide.

5. The process of claim 2 wherein promoter amount is about 0.3 to about 5.0 mole percent based on caprolactam.

6. The process of claim 2 wherein the polymerization is conducted at a temperature within the range of about 80° C. to about 250° C.

7. The process of claim 2 wherein the promoter has the formula

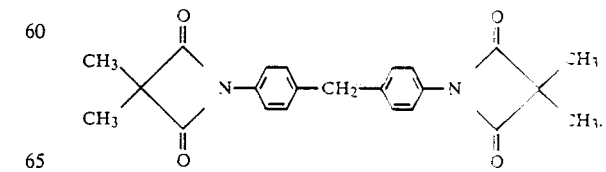

8. The process of claim 2 wherein the promoter has the formula

9. The process of claim 2 wherein the promoter has the formula
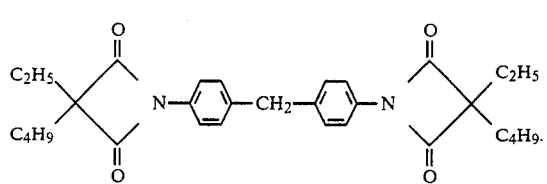
* * * * *